Oct. 2, 1928.
R. T. PIERCE
1,686,029
MOTOR CONTROL
Filed Feb. 23, 1922
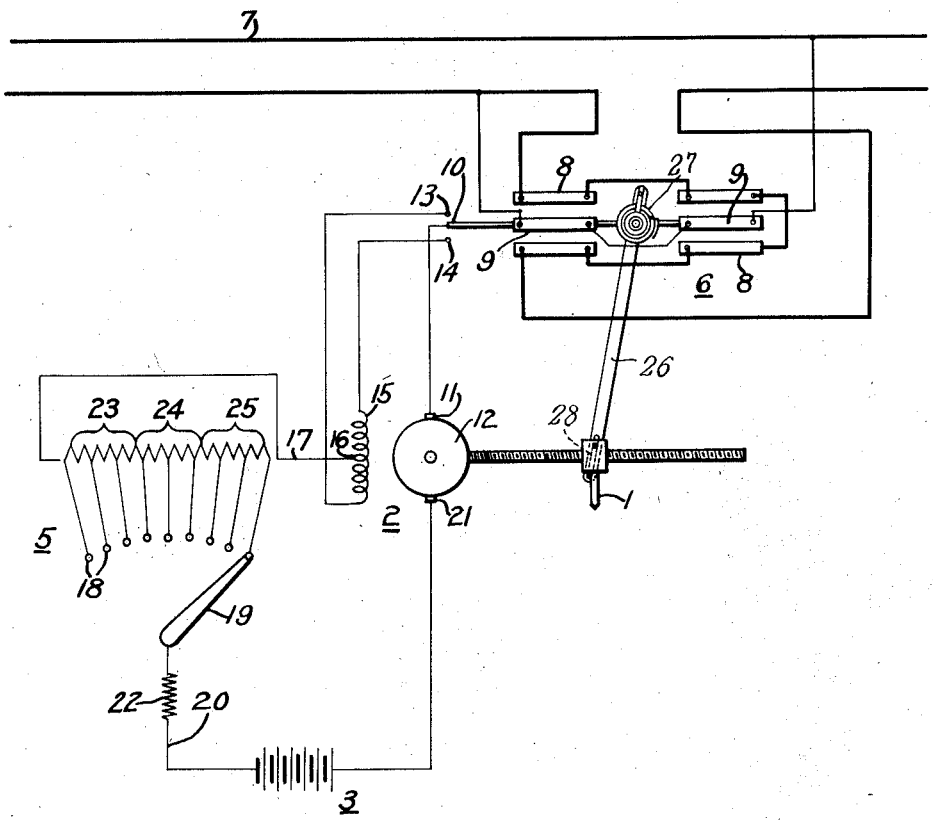
WITNESSES:
A.J.Schiefelbein
F.H.Miller
INVENTOR
Raymond T. Pierce.
BY
Wesley G. Carr
ATTORNEY Patented Oct. 2, 1928.

1,686,029

UNITED STATES PATENT OFFICE.

RAYMOND T. PIERCE, OF SWISSVALE, PENNSYLVANIA, ASSIGNOR TO WESTINGHOUSE ELECTRIC & MANUFACTURING COMPANY, A CORPORATION OF PENNSYLVANIA.

MOTOR CONTROL.

Application filed February 23, 1922. Serial No. 538,811.

My invention relates to electrical measuring instruments and particularly to means for operating the stylus of the recording instrument and adjusting the same.

One object of my invention is to provide a device of the above indicated character that shall be so constructed and connected as to considerably reduce the number of parts heretofore considered essential in certain instruments of the above designated class.

Another object of my invention is to provide an electrical measuring instrument with means for greatly facilitating its adjustment for circuits of different characters.

Another object of my invention is to provide an actuating motor for an electrical measuring instrument that shall operate at uniform speed; that shall have increased torque and that shall permit adjustment of its speed of operation in a simple and expeditious manner.

Another object of my invention is to provide an electrical measuring instrument embodying a motor that may be reversed in its direction of rotation, without by-passing any of the actuating current thereof from the motor field or armature, and with which a single resistor is utilized to obtain speed and torque adjustments in accordance with any one of several energizing circuits with which the motor may be employed.

A further object of my invention is to provide an electrical measuring instrument that shall be simple and durable in construction, economical to manufacture and effective in operation.

Heretofore, in certain electrical measuring instruments, such as those of the recording type, it has been usual to employ relatively small motors for operating the recording pens or styli. It has also been usual to regulate the operating motors by means of parallel-connected resistors, each having several parts which were required to be exact duplicates of the corresponding parts of the other in order that the speed of the motor should be the same in both directions. These parts were selectively connected, by means of numerous taps, to the motor-field circuit to adjust the meter for service in connection with circuits of different characters. Also, by reason of the fact that the one resistor was connected in parallel with the field of the motor, while the other resistor was in series therewith, the ratio of the brush resistance of the motor to the resistance of the regulating resistors was sufficiently large to be a serious factor of error in the operation of the meter, when the brushes were either too far ahead of, or behind, their neutral positions.

The above described arrangement of parts also operates under certain conditions to bypass or shunt certain of the field and armature current in such manner as to weaken the motor torque and to employ the field winding inefficiently.

The parallel-resistor arrangement further required an excessive number of terminal members for effecting adjustments when the instrument was being installed in any one of circuits of different characteristics. Such circuits, for which one style of instrument may be so adapted, are direct-current circuits and alternating-current circuits of different frequencies.

In practicing my invention, I provide an electrical measuring instrument having a single variable series resistor and a field winding that are so connected as to avoid the above-mentioned objections.

The arrangement of parts is such that all of the actuating current of the motor field and armature so traverses corresponding field portions and a single resistor as to preclude variations in the operating characteristics of the motor caused by variations in the reversing circuits. Also, since the adjustment of the speed and torque of the motor is effected by adjustment of the single resistor, the motor may be adjusted to operate in both directions at corresponding different speeds and torques without affecting its characteristics. There being no corresponding resistor parts to be accurately paired, the construction of the resistor becomes relatively simple, and the number of taps for adjustment, is reduced to a minimum.

The single figure of the accompanying drawings is a view, partially in elevation and partially diagrammatic, of a device constructed in accordance with my invention.

An instrument embodying my invention may comprise, in general, an indicating or recording device 1, such as a pointer or stylus, an operating motor 2 therefor, a source of energy 3, such as a battery, an adjusting resistor 5 and a Kelvin balance 6 connected to a circuit 7, the energy of which it is desired to measure. The battery 3 is only representative of any one of several sources of electromotive force that may be employed in its place, such as a direct-current source, a twenty-five cycle alternating-current source or a sixty-cycle alternating-current source.

The Kelvin balance 6 comprises stationary and movable current and voltage coils 8 and 9, respectively, connected and related to actuate the movable coils 9 in accordance with the energy traversing the circuit 7, in a usual and well known manner. The coils 9 are mounted on a movable member upon which the contact member 10 that is connected to one terminal 11 of the armature 12 of the motor 2 is also mounted. The contact member 10 is adapted for engagement with stationary contact members 13 and 14, between which the field winding 15 of the motor 2 is connected.

The stylus or pointer 1 is operatively connected to the coils 9 by an arm 26 and a spring 27. The outer end of the arm 26 is provided with a slot 28 so that the stylus 1 is free to move laterally, but in so moving it turns the arm 26 about its pivotal axis to increase or decrease the moment of the coils 9 through the spring 27.

One end of the resistor 5 is connected to the middle point 16 of the field winding 15 by a conductor 17. Each end and a plurality of spaced intermediate points of the resistor are connected to contact buttons 18 which are disposed in the arc of a circle to be successively engaged by the free end of a movable arm 19, the other end of which is connected to one terminal of the source of energy 3 by a conductor 20, the other terminal of the source 3 being connected to a terminal 21 of the armature 12. A resistor 22 may be connected in the conductor 20 to effect relatively large steps in the adjustment of the instrument, if desired, such as from 110 volts to 220 volts. Adjustments of the speed of the motor 2 and adapting it for circuits of different characters, are effected by moving the arm 19 of the resistor 5 from one to another of contact members 18. The contact members 18 are connected to various sections 23, 24 and 25 of the resistor proper.

In operation, assuming the circuit 7 to be energized and the value of the energy to be indicated by the positon of the pen or stylus 1, an increase or a decrease in the value of this energy will cause the movable contact member 10 to engage the one or the other of the stationary contact members 13 and 14, in a usual and well-known manner. When the contact member 10 engages the contact member 13, a circuit will be completed from one terminal of the source of energy 3, through the motor armature 12, the contact members 10 and 13, one half of the field winding 15, the conductor 17, a portion of the resistor 5, the arm 19 and the conductor 20 to the other terminal of the energy source 3, to thus cause the armature 12 to rotate in the proper direction and to cause the pen 1 to move in a corresponding direction. The movement of the pointer 1 causes the arm 26 to be moved in such direction as to increasingly resist the unbalancing forces between the coils 8 and 9 until such position is reached that the turning moment between the coils is balanced by the turning moment of the spring, causing the contact member 10 to take a position midway between the contact members 13 and 14, thus breaking the meter circuit and stopping the motor. The position of the pointer 1 indicates, at all times, the amount of energy or other characteristic traversing the circuit 7. When the contact member 10 engages the contact member 14, a circuit will be completed from one terminal of the energy source 3, through the motor armature 12, the contact members 10 and 14, the other half of the field winding 15, the conductor 17, a portion of the resistor 5, the arm 19 and the conductor 20 to the other terminal of the source of energy 3, to thus reverse the direction of rotation of the armature 12.

It will be noted that, in either direction of rotation of the armature 12, the current from the source 3 passes through the same portion of the resistor 5, so that the resistor will be a constant factor for either direction of rotation, irrespective of how it is adjusted by the arm 19. A device of this character ensures a better torque for the motor than was provided by former practice, wherein parallel resistors were employed and it obviates the possibility of error caused by inequalities of the parallel resistors and also renders the resistance error caused by motor-brush lead or lag a negligible quantity.

When the source of energy 3 supplies direct-current adjustment of the field-winding current is effected by moving the arm 19 over the contact members 18 included in section 25. When the source of energy 3 supplies 25 cycle, alternating current, the adjustment is effected by moving the arm 19 over the contact members 18 included in the section 24 of the resistor 5. When 60 cycle alternating current is supplied from the source of energy 3, the adjustment is effected by moving the arm 19 over the contact members 18 in section 23.

In order that the motor 12 shall operate at speeds that are substantially equal for direct current, 60-cycle alternating current and 25-cycle alternating current, it is necessary that the resistor 5 be made in decreasing resistance steps from direct current to 60-cycle alternating current through 25-cycle alternating current. Assuming constant voltage from the source of supply 3 and also assuming fixed inductance in the coil circuits of the field and armature windings, it is necesary that the resistance of the unit 5 be decreased as the frequency of the supply circuit increases. For instance, if the position of the arm 19 be kept constant, and 60-cycle alternating current is substituted for the battery 3, the motor 12 will operate at a substantially reduced speed because of the reduced current traversing its rotor and stator windings incident to the reactance offered to the increased frequency of the motivating current. The different sections 23, 24 and 25 are so arranged that the variable resistance necessary to accommodate the alternating-current circuits are arranged to be used with the direct-current circuit also. That is, for direct current, the sections 23 and 24 are fixed resistance, and for 25-cycle alternating current, the resistance 23 may be said to be fixed while the section 24 is variable, but for 60-cycle alternating current the section 23 is variable and the sections 24 and 25 are entirely eliminated. The resistances that are variable for one set of conditions become fixed for another set of conditions. Such arrangement of the resistor 5 in a single unit greatly reduces the cost of equipment. For example, three separate sets of resistors, with their corresponding fixed resistances, are difficult to change, relatively expensive, and unnecessary in view of my novel arrangement.

It will be noted that the section 25 is for complete adjustment during the employment of one character of the control current and that the section 24 is for the complete adjustment during the employment of another character of current but that the section 23 is included in the circuit in its entirety when the control current in connection with which the section 24 is employed is in service. Similarly, the sections 23 and 24 are in circuit when the control current for which the section 25 is employed is in service.

The construction and arrangement of circuits provides an extremely simple and effective device, reduces the number of terminals and other parts, and, in general, improves the operating characteristics of the instrument to a relatively high degree.

While I have shown and described a particular form of my invention, changes may be effected therein without departing from the spirit and scope thereof, as set forth in the appended claims.

I claim as my invention:

1. In combination, a motor having rotor and stator windings one of which is divided in substantially similar sections for causing a predetermined forward or backward direction of rotation of the rotor winding, a variable resistor for governing the speed of the motor, and means for connecting the resistor in the same circuit relation with either one of the said sections.

2. In combination, a motor having rotor and stator windings, said stator winding being divided in substantially similar sections for causing a predetermined forward or backward direction of rotation of the rotor winding, a variable resistor for governing the speed of the motor, and means for connecting the resistor in the same circuit relation with either one of the said sections.

In testimony whereof, I have hereunto subscribed my name, this 17th day of February, 1922.

RAYMOND T. PIERCE.